April 28, 1964     A. C. MARSHALL     3,130,819
ENERGY ABSORBER
Filed Nov. 9, 1962
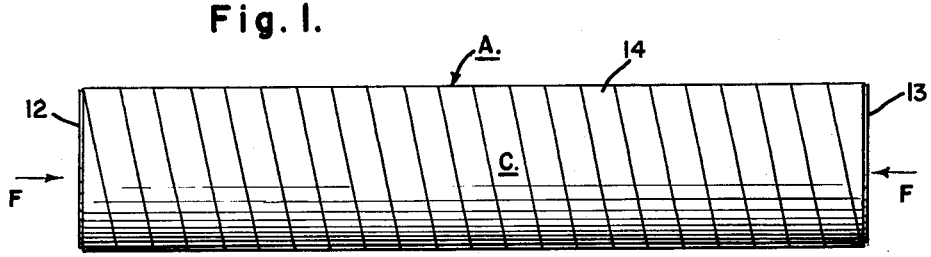
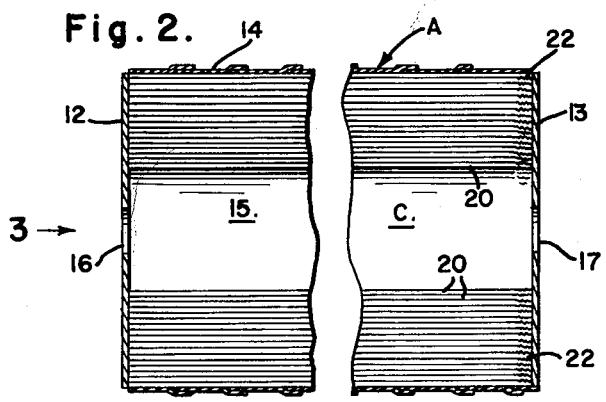
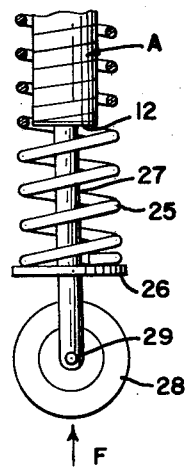
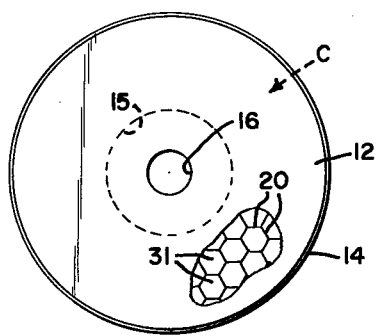
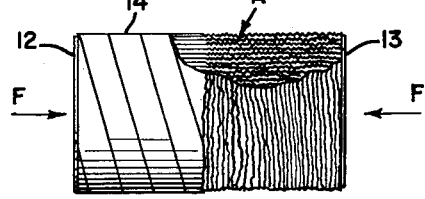
INVENTOR.
Andrew C. Marshall

United States Patent Office 3,130,819
Patented Apr. 28, 1964

3,130,819
ENERGY ABSORBER
Andrew C. Marshall, Lafayette, Calif., assignor to Hexcel Products Inc., Berkeley, Calif.
Filed Nov. 9, 1962, Ser. No. 236,617
7 Claims. (Cl. 188—1)

This invention relates to an energy absorbing honeycomb structure.

Conventional honeycomb is noted for its uniform energy absorption characteristics when columnar mechanical forces are applied to the columnar ends of honeycomb cells. Generally, in forming such a structure, a plurality of corrugated ribbons of sheet material such as metal foil, paper, plastic or the like are bonded together at spaced node points thereby fabricating a plurality of hollow multisided columnar cells, all extending axially in the same direction. Under the influence of mechanical forces applied to the columnar ends of the cells, the cell walls formed by the individual ribbons fold into small accordion-like pleats resulting in a compression of the structure and absorption of energy.

One of the shortcomings of prior art honeycomb energy absorbers is that the structural strain imposed on the honeycomb causes delamination of the bonded node points, and this in turn results in the rupture, buckling and outward splaying of the cell walls, thereby reducing the number of aligned, effective energy absorbing cells and decreasing the energy absorption characteristics of the material. In this connection the bonded node points of most types of honeycomb are the structurally weakest points of the material, and hence the node points will usually fail (by delamination) before the ribbons themselves will collapse, shear, or otherwise fail.

In attempting to overcome the delamination problem, cellular structures have been encased within an outer cylindrical or preformed shell which was in turn bonded to the outer edges of the columnar cells. Although this partially eliminated the problem, the cylinders or shells tended to add to or increase the columnar strength as the cellular structure was collapsed or compressed. That is, the amount of force required for subsequent increments of collapse would be increased as the structure shortened, thereby resulting in an energy absorber which would not reliably provide uniform energy absorption characteristics.

An object of this invention is to provide an energy absorber of the type having a honeycomb core in which the outer surface is wrapped with a flexible tape having high tensile strength, thereby providing an outer surface having a high degree of hoop strength while being susceptible to crumpling in the axial direction.

A feature and advantage of this invention resides in the fact that the high tensile strength of the tape prevents delamination and outward splaying of the honeycomb cells as they are compressed, thereby maintaining the uniform energy absorption characteristics of the honeycomb core. This thereby insures uniform, progressive axial accordion-like folding of the honeycomb cell walls as axial pressure is applied to the structure.

Another feature resides in the fact that the tape which provides for high hoop strength will, nevertheless, readily crumple and thus not add compression strength to the core in the axial direction. This assures uniform compression strength and energy absorption characteristics as the honeycomb core is compressed.

Another object of this invention is to provide an energy absorber having the advantages above named and in which the honeycomb can also be pre-failed at one end, thereby assuring that columnar failure will occur immediately upon exceeding the crush strength rather than after first exceeding the higher columnar strength of the honeycomb.

Other features and objects of this invention will become apparent upon reading the detailed description and the accompanying drawings in which:

FIG. 1 is a side view of the encased honeycomb energy absorber;

FIG. 2 is an enlarged cross-sectional view of the end portions of the honeycomb energy absorber of FIG. 1 taken along the center line;

FIG. 3 is an enlarged end view of the energy absorber of FIG. 1 in which a portion of the end plate is broken away to illustrate the cell ends of the honeycomb core;

FIG. 4 illustrates the energy absorber of FIG. 1 subsequent to being compressed under the influence of axially applied mechanical forces;

FIG. 5 illustrates how the invention may be used as an energy absorber for the tail wheel of an aircraft.

Generally, the invention comprises an energy absorber having a central honeycomb core C enclosed at either end by end plates 12 and 13. The entire outer surface of central honeycomb core C is encased within a spirally wound tape 14. Axially applied mechanical forces, indicated generally by arrows F, can be exerted on end plates 12 and 13 resulting in an axial compression when the crush strength of encased central honeycomb core C is exceeded, thereby providing a cushioning effect and absorption of energy.

As illustrated in FIGS. 2 and 3, the central honeycomb core C comprises corrugated ribbons 20 which are bonded together at spaced node points, thereby forming the walls of a plurality of hollow hexagonal cells 31 which extend in a common columnar direction parallel to the central axis of energy absorber A. Any conventional bonding processes such as welding or the application of a chemical adhesive can be used at the node points, thereby creating a junction which is susceptible to failure under extraordinary stress conditions.

One characteristic of honeycomb is that its compression or columnar strength is approximately 50% higher than its uniform crush strength. For this reason, the higher compression or columnar strength has to be first overcome before honeycomb core C will start to crush. In order to overcome this problem, one end of honeycomb core C is pre-failed or pre-crushed, indicated generally at 22, thereby insuring uniform energy absorption or failure at the lower crush strength.

Central honeycomb core section C has been illustrated as a cylinder having a concentric hollow inner passageway 15 which runs the entire columnar length. The cylindrical outer surface of central core C will have an irregular face formed by the projecting surfaces of the ribbons 20.

End plates 12 and 13, of the same general circular shape as the cylindrical cross section of central core C, are bonded to the upper and lower end edges of ribbons 20. Centrally located apertures 16 and 17 are concentrically aligned with one another along the axis of energy absorber A. These apertures, along with the hollow passageway 15 of central core C, form a receptacle for a sliding or reciprocating columnar member such as a strut for a wheel or any other structural support.

The outer surface of central honeycomb core section C is encased within spirally wrapped tape ribbon 14 and which extends generally from end plate 12 to end plate 13. Each adjacent convolution of ribbon or tape 14 can be overlapped slightly to provide additional strength, although it is only necessary to completely enclose the entire outer surface of central core ribbons 20. Tape 14 is non-extensible, having high tensile strength while yet being very flexible and capable of being easily crumpled.

Tapes having these characteristics are generally made of plastic or other flexible material such as Mylar and reinforced with nylon or glass fibers.

As energy absorber A is progressively compressed, tape 14 crumples and folds along the crushed portion of honeycomb core C. Since the outer tape 14 easily crumples under very slight edgewise applied forces, no noticeable strength is added in the columnar direction.

As illustrated in FIG. 4, energy absorber A has been compressed along a major portion of its length by energy applied in the direction of axial force arrows F. In the broken away section, the cross-sectional side view of the ribbons 20 illustrates the plurality of small accordion-like pleats which have formed along their entire crushed portion. These pleats initially started at the pre-crushed end, being similar in size to the initial pre-crushed pleats which have been shown generally at 22, and have progressed down the ribbons 20 in the columnar direction. As a result of the small accordion-like pleating, structural strains and stresses are set up along the bonded node points of adjacent ribbons 20, thereby increasing the probability that shearing or delamination will occur. Since the outer tape wrap 14 has high tensile strength and is generally non-extensible, it restrains delaminated ribbons 20 and prevents outward splaying, thereby maintaining all the cells effectively columnarly confined and oriented in the direction of the axial force arrows F. As a result, a constant number of hollow honeycomb cells 21 are columnarly crushed, thereby preventing a decrease in crush strength.

Since ribbon 14 does not add appreciable crush strength to energy absorber A when crumpled; and since the high tensile strength maintains and delaminated ribbons in the columnar direction preventing a decrease in the crush strength, an energy absorber A having uniform energy absorption characteristics throughout its entire usable length is provided.

FIG. 5 illustrates one embodiment in which energy absorber A can be used for isolating easily damaged machinery or equipment such as an aircraft tail (not shown) from the transmission of extraordinary shocks or forces. It is conventional to isolate aircraft from ordinary taxying shocks by some type of shock absorbing means such as the spring 25 which is restrained at one end by a plate 26 and is attached to the airframe at the other end. Forces transmitted along the reciprocating strut or support member 27 will be cushioned by the coil spring 25 under normal operating conditions.

When extraordinarily high forces, such as encountered in landing operation, are applied to conventional shock absorber 25, its inherent stiffness is overcome, thereby exceeding the energy absorption limits and resulting in the mechanical parts bottoming against each other in a substantial metal-to-metal contact with possible damage and destruction resulting. Usually the damaging shock forces are so much greater than normal shocks and occur at such infrequent intervals that the low level energy absorption advantages of the conventional shock absorber would be negated if attempts were made to stiffen it.

By axially aligning energy absorber A around sliding member 27, any extraordinary forces will be applied to end plate 12 resulting in a cushioning effect and energy absorption when the restraining plate 26 strikes it. With additional energy absorber A, the aircraft can be protected from high level shocks as long as the central core is not effectively, fully compressed.

It is not required that encased energy absorber A be used in conjunction with an aircraft or even in combination with the conventional shock absorber such as illustrated in 5. With such other usage it would not be necessary to provide the concentric passageway 15, since the upper end of energy absorber A would be secured to whatever equipment is to be protected while the lower end would be in direct contact with the ground or any ground member. Then, if the equipment was subject to high level shocks directed in the columnar direction of the honeycomb, the absorber A would tend to compress thereby cushioning these shocks and protecting the machinery.

Although the foregoing invention has been described in some detail by way of illustration and example for purposes of clarity of understanding, it is understood that certain changes and modifications may be practical within the spirit of the invention as limited only by the scope of the appended claims.

What is claimed is:

1. An energy absorber having uniform energy absorption characteristics of the type having a honeycomb core which compresses under the influence of mechanical forces, comprising: a plurality of corrugated ribbons bonded to one another at spaced node points, said ribbons defining a multitude of hollow columnar cells, each of said cells being parallel aligned with one another in the columnar direction and each extending the entire length of said core, end means connected to contact the columnar cell edges of said ribbons for distributing energy across the cell ribbon edges in the columnar direction, encasing means having no significant columnar strength housing said honeycomb core, said encasing means having a high hoop strength, said honeycomb core being operable to compress under the influence of mechanical forces exerted upon said end means in the columnar direction with the said ribbons adapted to progressively fold into small accordion-like pleats along the columnar length, said encasing means being operable to restrain the cell wall against outward splaying and maintain the cells columnarly oriented in the direction of the applied mechanical force vector.

2. The energy absorber of claim 1 in which said corrugated ribbons include a pre-crushed portion extending a short axial distance from one end of said core, said crushed wall being defined by a plurality of small accordion-like pleats.

3. An energy absorber having uniform energy absorption characteristics comprising multi-cellular honeycomb core means having ribbon walls laminated to define a plurality of aligned hollow columnar cells each extending the entire length of said core, a casing having no significant columnar strength housing said core and comprising a non-extensible tape having no appreciable stiffness and high tensile strength being spirally wrapped around said honeycomb core to provide relatively high hoop strength about said core, means for uniformly distributing compressional mechanical force to the ribbon wall edges at the columnar ends of the cells and directing the force in the columnar direction, said ribbon walls being adapted to progressively fold into a plurality of accordion-like pleats along the columnar dimension as the energy absorber is crushed, said encasing tape being adapted to crumple upon crushing of the honeycomb core to restrain the cell walls of the honeycomb against outward splaying and maintain the cells columnarly oriented in the direction of the applied forces.

4. The energy absorber of claim 3 in which said ribbon walls of each of said cell are pre-crushed at one end into small accordion-like pleats for a short distance in the columnar direction.

5. A high level energy absorber, for use in combination with a low level shock absorber, which high level shock absorber is connected to absorb energy only when the stiffness of the low level energy absorber is overcome, comprising: a columnar honeycomb core including ribbon walls defining a plurality of parallel aligned columnar hollow cells each extending the length of the core, and forming the wall of a central hollow passageway extending the entire columnar length of said core, a housing for said honeycomb core comprising tape means spirally wound around the outer surfaces of the honeycomb core, said tape means being non-extensible and flexible providing a housing having no significant stiffness and a relatively high hoop strength, end plates contacting the ribbon edges at each end of the columnar cells, each said end plate having a concentric aperture coaxial with one another and said central hollow passageway, said passageway and said apertures receiving a reciprocating rod connected to the low level energy absorber, said honeycomb core ribbon walls adapted to be progressively crushed into small accordion-like pleats by the rod means when the stiffness limit of the low level shock absorber is exceeded.

6. An energy absorber of the type that is crushed by mechanical forces, comprising: an energy absorbing core including ribbon walls defining a plurality of aligned, hollow cells each extending the columnar length of said core, flexible tape means spirally wound around the entire outer side wall of the honeycomb core, said tape means being characterized by no noticeable stiffness, high tensile hoop strength and non-extensibility, means for applying compressional energy to the ribbon wall ends for columnarly crushing the core cells, said ribbon walls being adapted to be crushed into small accordion-like pleats when the columnar strength of the wall material is exceeded, thereby absorbing energy, said tape means hoop strength being operable to restrain the ribbon walls against outward splaying while the low stiffness does not add appreciable columnar strength to the energy absorber as it crushes.

7. An energy absorber having uniform energy absorption characteristics comprising: honeycomb core means having a plurality of parallel aligned cells, each extending the length of the core and being adapted to restrain compression force directed in the direction of the cell axis; encasing means connected to surround the side wall of said honeycomb core comprising tape means having no appreciable stiffness, being substantially non-extensible, and of high tensile strength, said tape means having high loop strength and low columnar strength and being operable to maintain the peripheral dimension of said core substantially constant without the addition of appreciable columnar strength as the core is crushed by compression forces directed parallel to the cell axis.

References Cited in the file of this patent

UNITED STATES PATENTS

| | | |
|---|---|---|
| 2,724,463 | Becker | Nov. 22, 1955 |
| 2,870,871 | Stevinson | Jan. 27, 1959 |
| 2,973,172 | Bixby | Feb. 28, 1961 |
| 3,010,540 | Dahlen | Nov. 28, 1961 |